United States Patent
Ichikawa et al.

(10) Patent No.: US 9,568,079 B2
(45) Date of Patent: Feb. 14, 2017

(54) VEHICLE POWER TRANSMISSION DEVICE

(71) Applicant: HONDA MOTOR CO., LTD., Tokyo (JP)

(72) Inventors: Kazuki Ichikawa, Wako (JP); Fumiyasu Suga, Wako (JP); Tsunehiro Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 12 days.

(21) Appl. No.: 14/647,019

(22) PCT Filed: Nov. 8, 2013

(86) PCT No.: PCT/JP2013/080214
§ 371 (c)(1),
(2) Date: May 22, 2015

(87) PCT Pub. No.: WO2014/087793
PCT Pub. Date: Jun. 12, 2014

(65) Prior Publication Data
US 2015/0308550 A1 Oct. 29, 2015

(30) Foreign Application Priority Data

Dec. 5, 2012 (JP) ................................. 2012-266637

(51) Int. Cl.
*F16H 29/04* (2006.01)
*F16H 3/44* (2006.01)
(Continued)

(52) U.S. Cl.
CPC ............... *F16H 29/04* (2013.01); *F16H 3/44* (2013.01); *F16H 7/06* (2013.01); *F16H 2057/0081* (2013.01); *F16H 2200/20* (2013.01)

(58) Field of Classification Search
None
See application file for complete search history.

(56) References Cited

U.S. PATENT DOCUMENTS 1,945,702 A * 2/1934 Pitter ...................... F16H 29/02
74/117
3,951,005 A * 4/1976 Dahlstrom ............ F16D 41/066
74/116
(Continued)

FOREIGN PATENT DOCUMENTS

CN 101382190 3/2009
JP S56-094058 A 7/1981
(Continued)

OTHER PUBLICATIONS

Office Action dated May 18, 2016, issued in counterpart Japanese Patent Application No. 2014-551002. (3 pages).
(Continued)

*Primary Examiner* — Derek D Knight
(74) *Attorney, Agent, or Firm* — Westerman, Hattori, Daniels & Adrian, LLP

(57) ABSTRACT

A vehicle power transmission device equipped with a crank type transmission unit is provided in which since a first sprocket provided on an input shaft upstream portion and a second sprocket provided on an output shaft downstream portion are connected by an endless chain, and a dog clutch is disposed between the input shaft main body portion and the input shaft upstream portion, when the input shaft main body portion is seized and becomes non-rotatable, the dog clutch is disengaged so as to detach the input shaft upstream portion from the input shaft main body portion, and the driving force of an engine is transmitted to the output shaft downstream portion via the input shaft upstream portion, the first sprocket, the endless chain and the second sprocket, thereby enabling the vehicle to travel in the minimum necessary way.

7 Claims, 16 Drawing Sheets

(51) Int. Cl.
*F16H 57/00* (2012.01)
*F16H 7/06* (2006.01)

(56) References Cited

U.S. PATENT DOCUMENTS

| | | | | |
|---|---|---|---|---|
| 4,112,778 | A * | 9/1978 | Korosue | F16H 29/04 |
| | | | | 74/117 |
| 5,189,927 | A * | 3/1993 | Egan | F16C 3/28 |
| | | | | 123/197.4 |
| 7,108,626 | B2 * | 9/2006 | Friedmann | B60K 6/36 |
| | | | | 475/8 |
| 2005/0039572 | A1 | 2/2005 | Friedmann | |
| 2012/0058858 | A1 | 3/2012 | Ichikawa et al. | |
| 2013/0090207 | A1 * | 4/2013 | Ichikawa | B60K 6/44 |
| | | | | 477/6 |
| 2015/0276032 | A1 * | 10/2015 | Ichikawa | B60K 1/00 |
| | | | | 74/116 |
| 2015/0292604 | A1 * | 10/2015 | Nishimura | F16H 29/04 |
| | | | | 74/117 |
| 2016/0273634 | A1 * | 9/2016 | Ichikawa | F16H 29/04 |

FOREIGN PATENT DOCUMENTS

| | | |
|---|---|---|
| JP | 11-190411 A | 7/1999 |
| JP | 2005-502543 A | 1/2005 |
| JP | 2012-51539 A | 3/2012 |
| JP | 2012-506003 A | 3/2012 |
| JP | 2012-224313 A | 11/2012 |

OTHER PUBLICATIONS

International Search Report dated Feb. 10, 2014 issued in corresponding application No. PCT/JP2013/080214.
Office Action dated Aug. 15, 2016, issued in counterpart Chinese Application No. 201380060044.7, with English anslation. (10 pages).

* cited by examiner

TOP STATE

FIG.8

|  | FIRST MESHING SWITCHING MECHANISM | SECOND MESHING SWITCHING MECHANISM |
|---|---|---|
| PARKING RANGE | L | R |
| REVERSE RANGE | R | R |
| NEUTRAL RANGE | R | L |
| DRIVE RANGE | L | L |

FIG.9 PARKING RANGE

NEUTRAL RANGE

FIG.12 DRIVE RANGE NORMAL TRAVEL STATE

DRIVE RANGE
ENGINE BRAKING STATE

DRIVE RANGE
IDLING STOP STATE

VEHICLE POWER TRANSMISSION DEVICE

TECHNICAL FIELD

The present invention relates to a vehicle power transmission device equipped with a crank type continuously variable transmission mechanism.

BACKGROUND ART

A vehicle power transmission device that includes a plurality of crank type transmission units that convert rotation of an input shaft connected to an engine into back and forth movement of a connecting rod and convert back and forth movement of the connecting rod into rotation of an output shaft by means of a one-way clutch is known from Patent Document 1 below.

RELATED ART DOCUMENTS

Patent Documents

Patent Document 1: Japanese Patent Publication No. 2005-502543

SUMMARY OF THE INVENTION

Problems to be Solved by the Invention

Since the vehicle power transmission device described in Patent Document 1 above includes a bearing for supporting the input shaft on a transmission case, a bearing for supporting one end side of the connecting rod of each transmission unit on the input shaft, and a bearing for supporting the other end side of the connecting rod of each transmission unit on the output shaft, there is a possibility that the input shaft will become unable to rotate if just one of such a large number of bearings malfunctions. Moreover, since the crank type transmission unit can attain a state in which the gear ratio is infinite (a state in which no power transmission is carried out), a starting clutch is not provided between the engine and the transmission unit, and because of this when the input shaft is seized, there is the problem that the engine stalls and the vehicle becomes unable to travel.

The present invention has been accomplished in light of the above circumstances, and it is an object thereof to enable a vehicle to travel in the minimum necessary way even when an input shaft is seized in a vehicle power transmission device equipped with a crank type transmission unit.

Means for Solving the Problems

In order to attain the above object, according to a first aspect of the present invention, there is provided a vehicle power transmission device comprising a plurality of transmission units for transmitting rotation of an input shaft connected to a drive source to an output shaft, the transmission units being arranged side by side between the input shaft and the output shaft, the transmission units each comprising an input side fulcrum that has a variable amount of eccentricity from an axis of the input shaft and rotates together with the input shaft, a first one-way clutch that is connected to the output shaft, an output side fulcrum that is provided on an input member of the first one-way clutch, a connecting rod that has opposite ends thereof connected to the input side fulcrum and the output side fulcrum and moves back and forth, and a shift actuator that changes the amount of eccentricity of the input side fulcrum, wherein the input shaft comprises an input shaft main body portion connected to the transmission unit, and an input shaft upstream portion further on an upstream side in a power transmission direction than the input shaft main body portion, the output shaft comprises an output shaft main body portion connected to the transmission unit, and an output shaft downstream portion further on a downstream side in the power transmission direction than the output shaft main body portion, an input rotating member provided on the input shaft upstream portion and an output rotating member provided on the output shaft downstream portion are connected by a power transmission member, and a clutch is disposed between the input shaft main body portion and the input shaft upstream portion.

Further, according to a second aspect of the present invention, in addition to the first aspect, a second one-way clutch and selection switching means are disposed between the output rotating member and the output shaft downstream portion, the second one-way clutch being engaged when a rotational speed of the output shaft downstream portion exceeds a rotational speed of the output rotating member and being disengaged when the rotational speed of the output shaft downstream portion is less than the rotational speed of the output rotating member, and the selection switching means connecting the output rotating member to the output shaft downstream portion or disconnecting the output rotating member therefrom.

Furthermore, according to a third aspect of the present invention, in addition to the first or second aspect, a damper is disposed between the drive source and the input shaft upstream portion.

Moreover, according to a fourth aspect of the present invention, in addition to any one of the first to third aspects, the clutch is a dog clutch.

A first output shaft 12 of an embodiment corresponds to the output shaft of the present invention, an eccentric disk 18 of the embodiment corresponds to the input side fulcrum of the present invention, a pin 19c of the embodiment corresponds to the output side fulcrum of the present invention, an outer member 22 of the embodiment corresponds to the input member of the present invention, a first sprocket 26 of the embodiment corresponds to the input rotating member of the present invention, a second sprocket 27 of the embodiment corresponds to the output rotating member of the present invention, an endless chain 28 of the embodiment corresponds to the power transmission member of the present invention, a dog clutch 52 of the embodiment corresponds to the clutch of the present invention, an engine E of the embodiment corresponds to the drive source of the present invention, and a second power transmission switching mechanism S2 of the embodiment corresponds to the selection switching mechanism of the present invention.

Effects of the Invention

In accordance with the first aspect of the present invention, when the input shaft is rotated by means of the drive source, the input side fulcrum rotates eccentrically, when the connecting rod having one end connected to the input side fulcrum moves back and forth, the output side fulcrum connected to the other end of the connecting rod moves back and forth, and the output shaft thus rotates intermittently via the first one-way clutch; rotation of the input shaft is changed in speed at a gear ratio corresponding to the amount of eccentricity of the input side fulcrum and is transmitted to the output shaft.

The input shaft includes the input shaft main body portion connected to the transmission unit, and the input shaft upstream portion further on the upstream side in the power transmission direction than the input shaft main body portion; the output shaft includes the output shaft main body portion connected to the transmission unit, and the output shaft downstream portion further on the downstream side in the power transmission direction than the output shaft main body portion. Since the input rotating member provided on the input shaft upstream portion and the output rotating member provided on the output shaft downstream portion are connected by means of the power transmission member, and the clutch is disposed between the input shaft main body portion and the input shaft upstream portion, when the input shaft main body portion is seized and becomes non-rotatable, the clutch is disengaged so as to detach the input shaft upstream portion from the input shaft main body portion, and the driving force of the drive source is transmitted to the output shaft downstream portion via the input shaft upstream portion, the input rotating member, the power transmission member, and the output rotating member, thereby enabling the vehicle to take refuge to a repair shop by means of the driving force of the drive source.

Furthermore, in accordance with the second aspect of the present invention, since the second one-way clutch and the selection switching means are disposed between the output rotating member and the output shaft downstream portion, the second one-way clutch being engaged when the rotational speed of the output shaft downstream portion exceeds the rotational speed of the output rotating member and being disengaged when the rotational speed of the output shaft downstream portion is less than the rotational speed of the output rotating member, and the selection switching means connecting the output rotating member to the output shaft downstream portion or disconnecting it therefrom, in a normal situation in which the selection switching means disconnects the output rotating member from the output shaft downstream portion, the driving force from the driven wheel due to deceleration of the vehicle can be transmitted back to the drive source via the output shaft downstream portion, the second one-way clutch, the output rotating member, the power transmission member, the input rotating member, and the input shaft upstream portion, thereby generating a braking force due to engine braking, etc. without any problem. Moreover, when the input shaft main body portion is seized, if the output rotating member is connected to the output shaft downstream portion by the selection switching means, the vehicle is able to take refuge by means of the driving force of the drive source, and when the vehicle stops, by disconnecting the output rotating member from the output shaft downstream portion by the selection switching means, the second one-way clutch slips, and running can be continued without stopping the drive source.

Furthermore, in accordance with the third aspect of the present invention, since the damper is disposed between the drive source and the input shaft upstream portion, when taking refuge in a state in which the input shaft main body portion is seized, the damping effect of the damper can be exhibited, thus ensuring good ride comfort.

Moreover, in accordance with the fourth aspect of the present invention, due to a dog clutch having a small axial dimension being employed as a clutch, it is possible to minimize any increase in the axial dimension of the vehicle power transmission device.

BRIEF DESCRIPTION OF DRAWINGS

FIG. 8 is a table for engagement of first and second meshing switching mechanisms. (first embodiment)

EXPLANATION OF REFERENCE NUMERALS AND SYMBOLS

Figure 1:
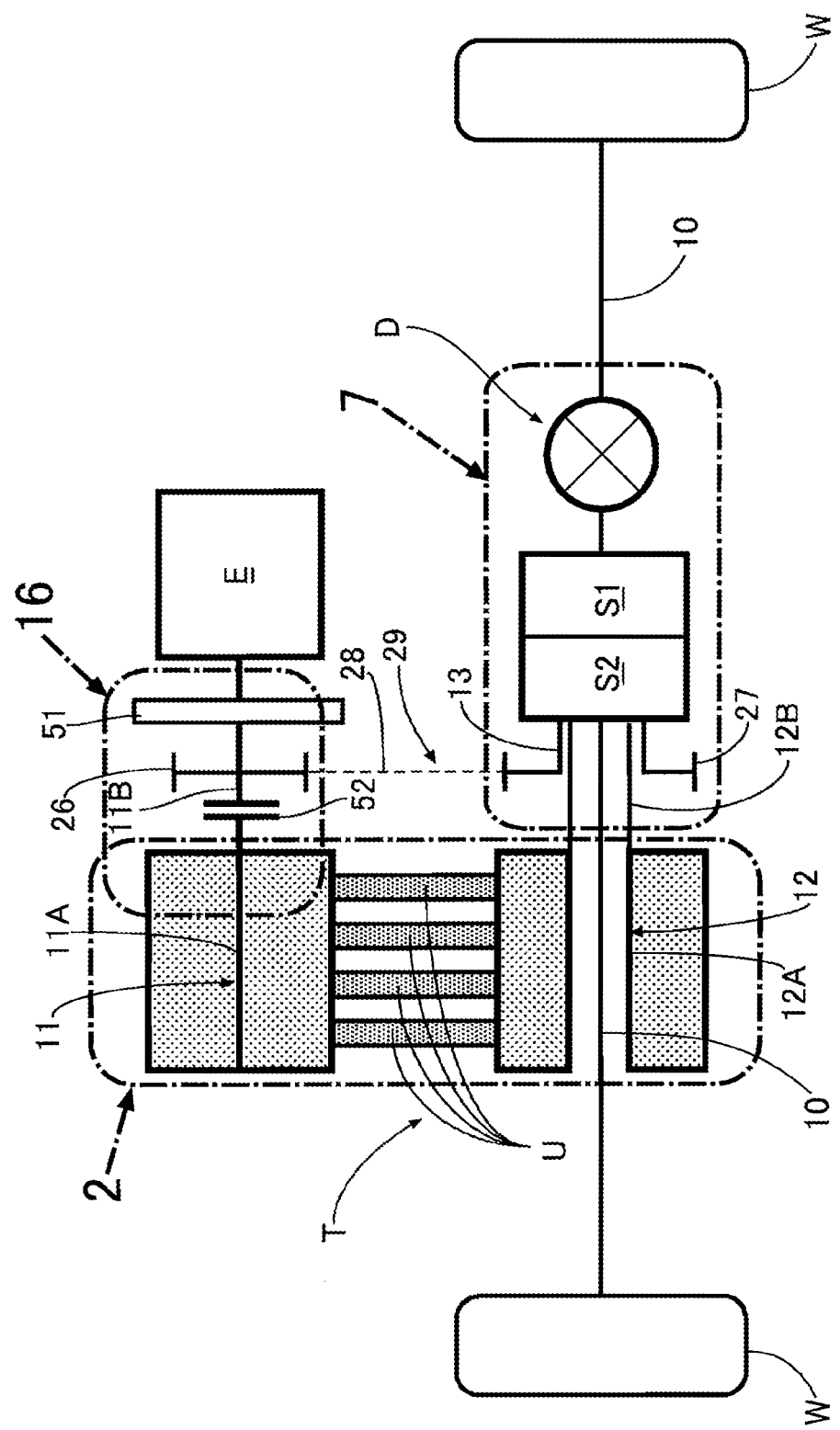
FIG. 1 is a skeleton diagram of a vehicle power transmission device. (first embodiment)

11 Input shaft
11A Input shaft main body portion
11B Input shaft upstream portion
12 First output shaft (output shaft)
12A Output shaft main body portion
12B Output shaft downstream portion
14 Shift actuator
18 Eccentric disk (input side fulcrum)
19 Connecting rod
19c Pin (output side fulcrum)
21 First one-way clutch
22 Outer member (input member)
26 First sprocket (input rotating member)
27 Second sprocket (output rotating member)
28 Endless chain (power transmission member)
45 Second one-way clutch
51 Damper
52 Dog clutch
E Engine (drive source)
S2 Second power transmission switching mechanism (selection switching means)
U Transmission unit

MODES FOR CARRYING OUT THE INVENTION

An embodiment of the present invention is explained below by reference to FIG. 1 to FIG. 16.

First Embodiment

As shown in FIG. 1, a vehicle power transmission device for transmitting the driving force of an engine E to driven wheels W and W via left and right axles 10 and 10 includes a continuously variable transmission T, a first power transmission switching mechanism S1, a second power transmission switching mechanism S2, and a differential gear D. The first power transmission switching mechanism S1 can switch between a parking range, a reverse range, a neutral range, and a drive range. The second power transmission switching mechanism S2 can switch between a normal travel/engine braking state, an idling stop state, and a fail state.

The structure of the vehicle power transmission device is now explained by reference to FIGS. 1 to 7.

As shown in FIG. 1, an input shaft 11 is formed from an input shaft main body portion 11A and an input shaft upstream portion 11B further on the upstream side (engine E side) in the driving force transmission direction than the input shaft main body portion 11A, the input shaft main body portion 11A being connected to the continuously variable transmission T, and the input shaft upstream portion 11B being connected to the engine E. A damper 51 is provided between the input shaft upstream portion 11B and the engine E, and a dog clutch 52 is provided between the input shaft main body portion 11A and the input shaft upstream portion 11B. The dog clutch 52 is maintained in an engaged state when the situation is normal, but the engagement is released when the input shaft main body portion 11A is seized, which is described later, thus detaching the input shaft main body portion 11A from the input shaft upstream portion 11B.

Furthermore, first output shaft 12 is formed from an output shaft main body portion 12A and an output shaft downstream portion 12B further on the downstream side (driven wheels W and W side) in the driving force transmission direction than the output shaft main body portion 12A, the output shaft main body portion 12A being connected to the continuously variable transmission T, and the output shaft downstream portion 12B being connected to the second power transmission switching mechanism S2. The output shaft main body portion 12A and the output shaft downstream portion 12B are always united.

Figure 16:
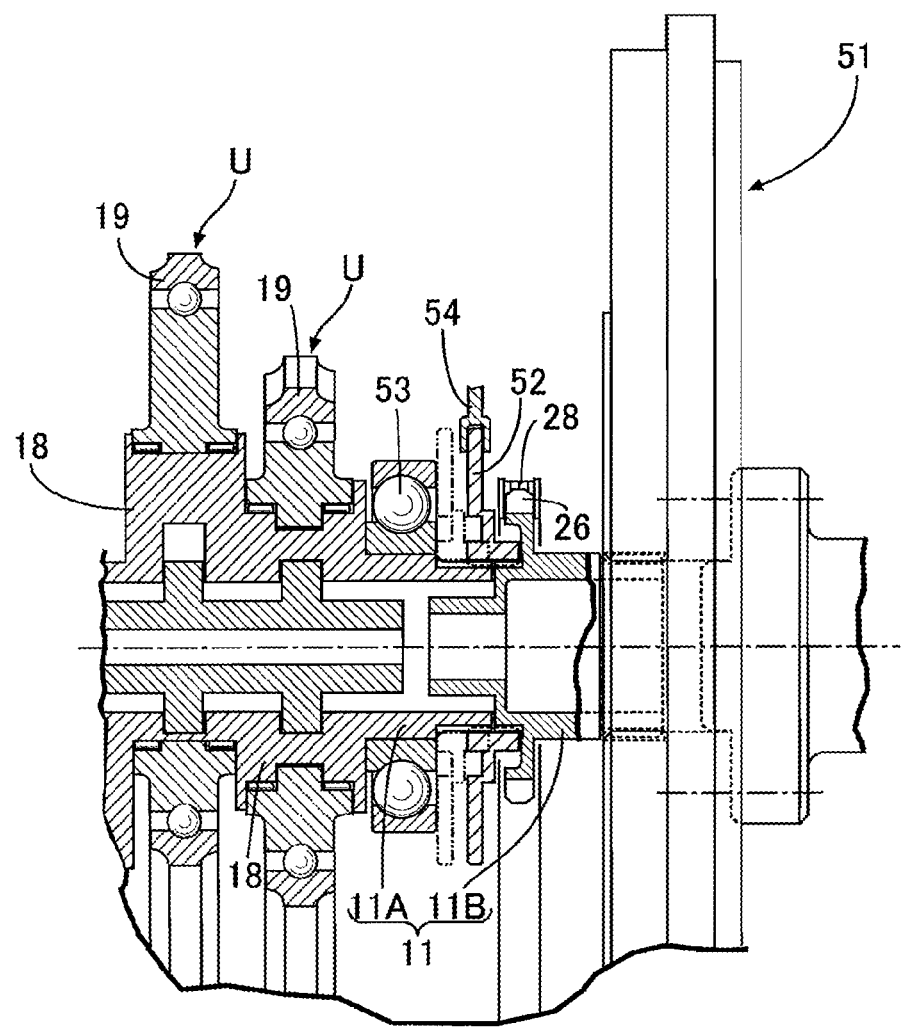
FIG. 16 is a detailed view of part 16 in FIG. 1. (first embodiment)

As shown in FIG. 16, the right end of the input shaft main body portion 11A is supported on a transmission case, which is not illustrated, via a ball bearing 53, and the outer periphery at the left end of the input shaft upstream portion 11B is relatively rotatably fitted into the inner periphery at the right end of the input shaft main body portion 11A. The inner periphery of the dog clutch 52 is spline fitted onto the outer periphery of the input shaft main body portion 11A and the outer periphery of the input shaft upstream portion 11B, and when the dog clutch 52 is moved leftward by means of a fork 54, the spline of the dog clutch 52 is disengaged from the spline of the input shaft upstream portion 11B, thus detaching the input shaft main body portion 11A from the input shaft upstream portion 11B.

Figure 2:
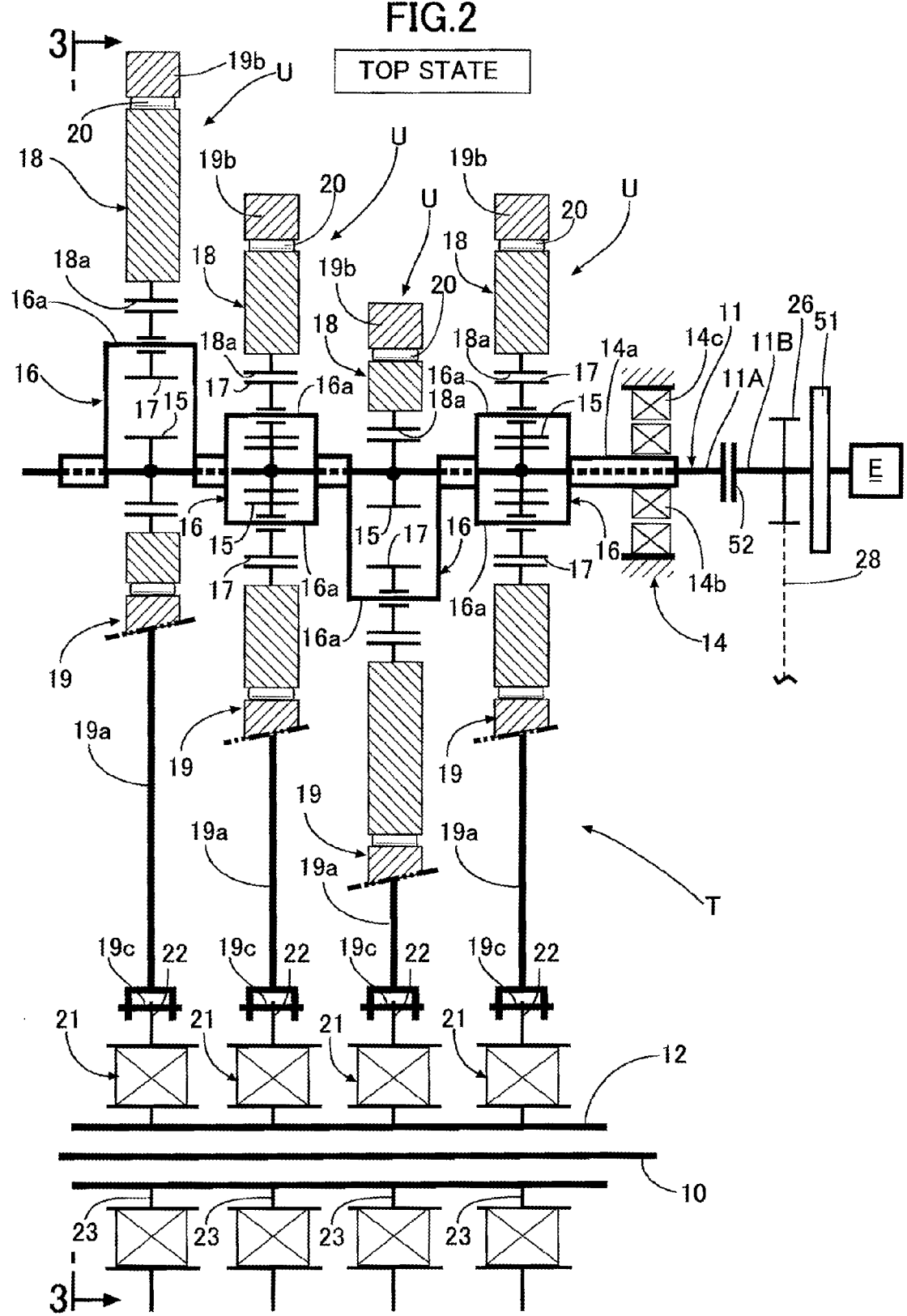
FIG. 2 is a detailed diagram of part 2 in FIG. 1. (first embodiment)
Figure 3:
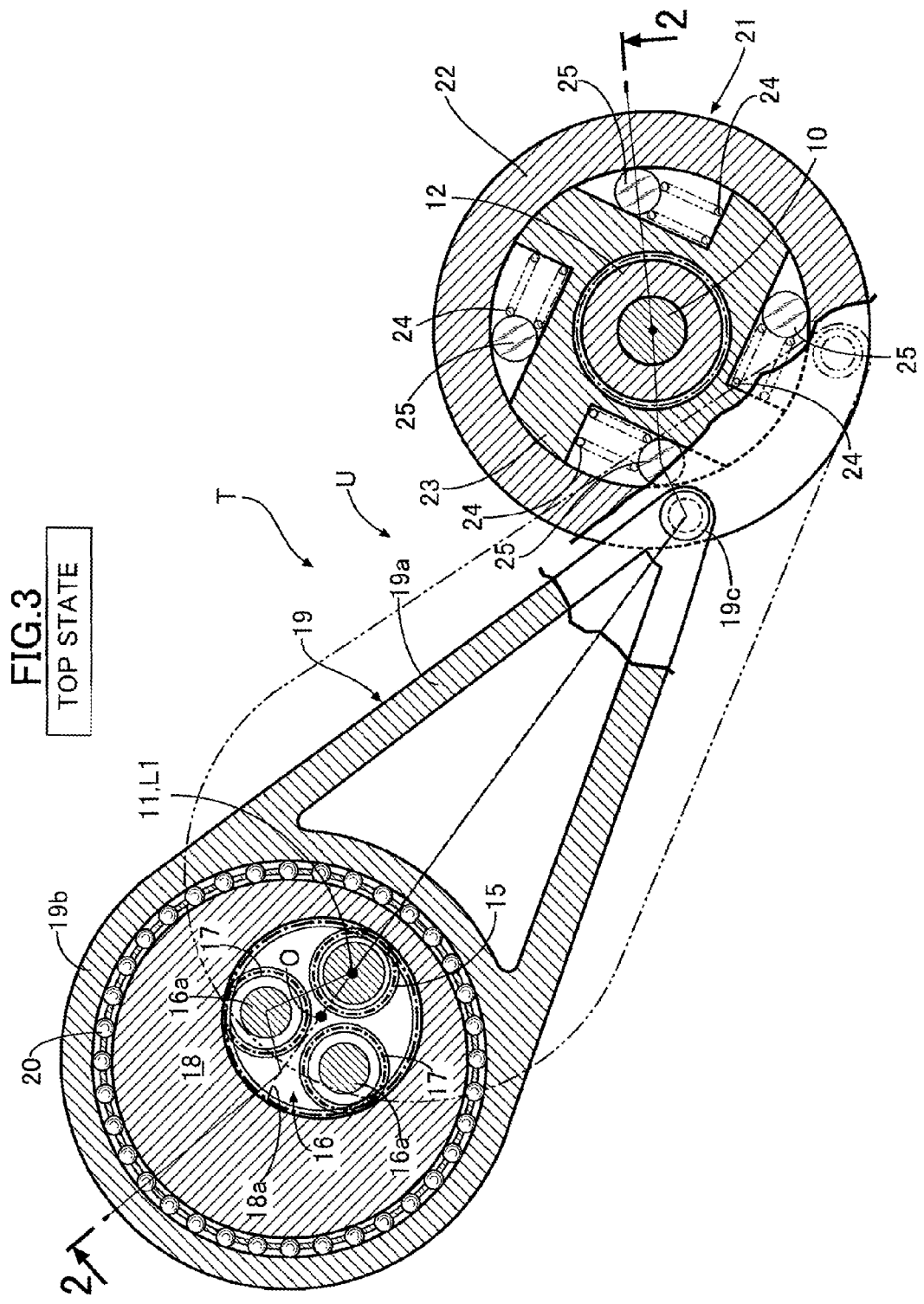
FIG. 3 is a sectional view (TOP state) along line 3-3 in FIG. 2. (first embodiment)

As shown in FIG. 2 and FIG. 3, the continuously variable transmission T of the present embodiment has a plurality (four in the embodiment) of transmission units U having the same structure superimposed on one another in the axial direction; these transmission units U include a common input shaft 11 and a common first output shaft 12 disposed in parallel to each other, and rotation of the input shaft 11 is reduced in speed or increased in speed and transmitted to the first output shaft 12.

The structure of one transmission unit U is explained below as being representative thereof. The input shaft 11, which is connected to the engine E and rotates, extends relatively rotatably through the interior of a hollow rotating shaft 14a of a shift actuator 14 such as an electric motor. A rotor 14b of the shift actuator 14 is fixed to the rotating shaft 14a, and a stator 14c is fixed to a casing. The rotating shaft 14a of the shift actuator 14 can rotate at the same speed as that of the input shaft 11 and can rotate at a different speed relative to the input shaft 11.

A first pinion 15 is fixed to the input shaft 11, which extends through the rotating shaft 14a of the shift actuator 14, and a crank-shaped carrier 16 is connected to the rotating shaft 14a of the shift actuator 14 so as to straddle the first pinion 15. Two second pinions 17 and 17 having the same diameter as that of the first pinion 15 are each supported via pinion pins 16a and 16a at positions forming an equilateral triangle in cooperation with the first pinion 15, and a ring gear 18a eccentrically formed in the interior of a circular plate-shaped eccentric disk 18 meshes with the first pinion 15 and the second pinions 17 and 17. A ring portion 19b provided at one end of a rod portion 19a of a connecting rod 19 is relatively rotatably fitted onto an outer peripheral face of the eccentric disk 18 via a ball bearing 20.

A first one-way clutch 21 provided on the outer periphery of the first output shaft 12 includes a ring-shaped outer member 22 pivotably supported on the rod portion 19a of the connecting rod 19 via a pin 19c, an inner member 23 disposed in the interior of the outer member 22 and fixed to the first output shaft 12, and rollers 25 disposed in a wedge-shaped space formed between an arc face on the inner periphery of the outer member 22 and a flat plane on the outer periphery of the inner member 23 and urged by means of springs 24.

As is clear from FIG. 2, the four transmission units U share the crank-shaped carrier 16, but the phase of each eccentric disk 18 supported on the carrier 16 via the second pinions 17 and 17 is different by 90° for each transmission unit U. For example, in FIG. 2, the eccentric disk 18 of the transmission unit U at the left-hand end is displaced upward relative to the input shaft 11 in the drawing, the eccentric disk 18 of the transmission unit U third from the left is displaced downward relative to the input shaft 11 in the drawing, and the eccentric disks 18 and 18 of the transmission units U and U second and fourth from the left are positioned in the middle in the vertical direction.

As is clear from FIG. 1, the continuously variable transmission T includes an auxiliary power transmission path that can transmit a driving force via a separate path from that by the six transmission units U. That is, a first sprocket 26 provided on the input shaft upstream portion 11B on the upstream side (engine E side) of the input shaft 12 and a second sprocket 27 provided on transmission shaft 13 relatively rotatably fitted around the outer periphery of the output shaft downstream portion 12B on the downstream side (differential gear D side) of the first output shaft 12 are connected via an endless chain 28; the first sprocket 26, the second sprocket 27, and the endless chain 28 form auxiliary power transmission means 29.

Figure 7:
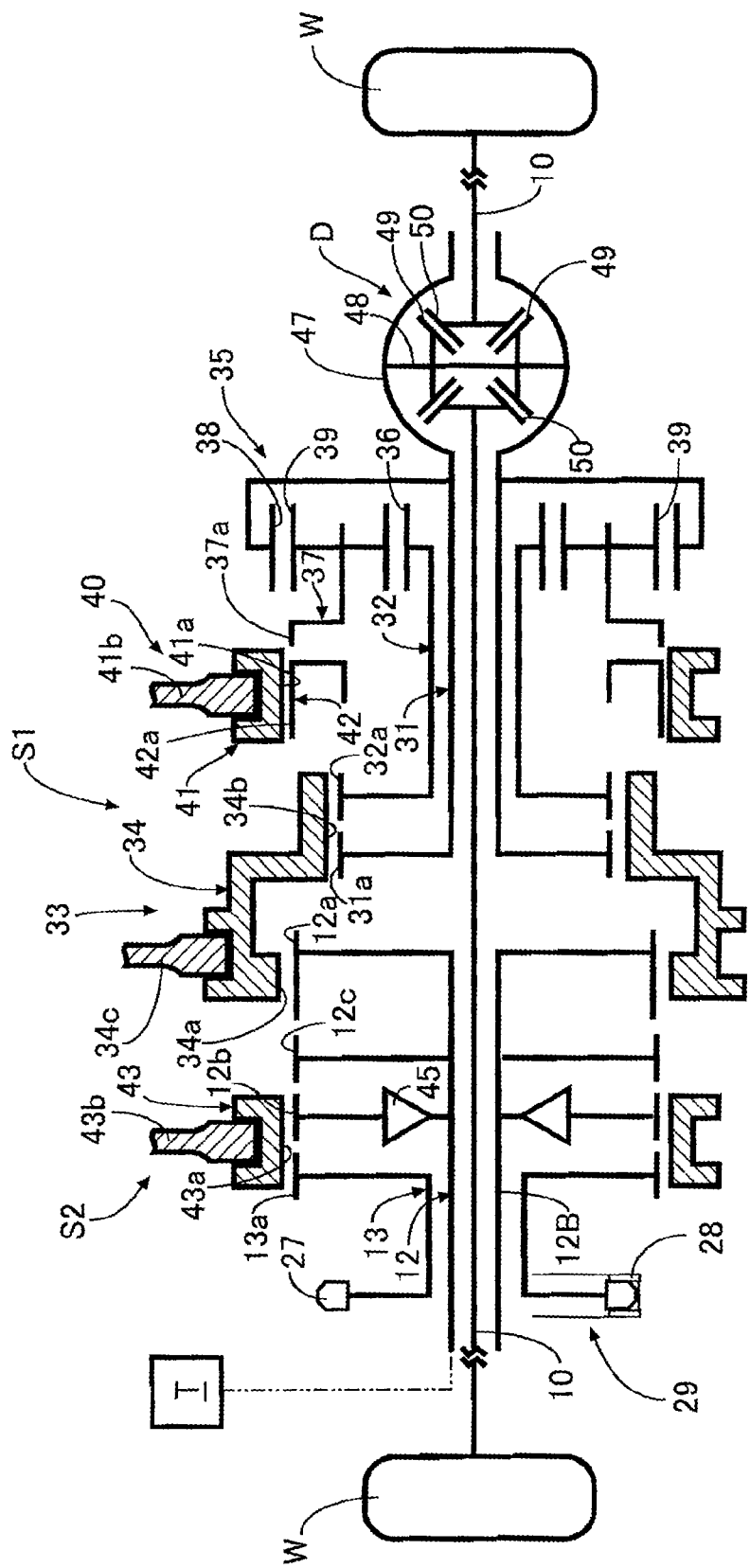
FIG. 7 is a detailed diagram of part 7 in FIG. 1. (first embodiment)

As is clear from FIG. 7, the first power transmission switching mechanism S1 includes, in addition to the tubular first output shaft 12 relatively rotatably fitted onto the outer periphery of the axle 10, a tubular second output shaft 31 relatively rotatably fitted onto the outer periphery of the axle 10 and a tubular third output shaft 32 relatively rotatably fitted onto the outer periphery of the second output shaft 31. A fourth outer peripheral spline 12a is formed on the right end of the output shaft downstream portion 12B of the first output shaft 12, a fifth outer peripheral spline 31a is formed on the left end of the second output shaft 31, and a sixth outer peripheral spline 32a is formed on the left end of the third output shaft 32.

The fourth outer peripheral spline 12a, the fifth outer peripheral spline 31a, and the sixth outer peripheral spline 32a form a first meshing switching mechanism 33, which is a dog clutch, and are aligned in the axial direction, the external diameters of the fifth outer peripheral spline 31a and the sixth outer peripheral spline 32a being equal to each other but smaller than the external diameter of the fourth outer peripheral spline 12a. A sleeve 34 of the first meshing switching mechanism 33 includes a second inner peripheral spline 34a having a large external diameter and a third inner peripheral spline 34b having a small external diameter; the second inner peripheral spline 34a always meshes with the fourth outer peripheral spline 12a, the third inner peripheral spline 34b always meshes with the sixth outer peripheral spline 32a, and the third inner peripheral spline 34b meshes with the fifth outer peripheral spline 31a only when moved to the left as shown in FIG. 7. That is, when the sleeve 34 is moved by a fork 34c to the right from the leftward moved state shown in FIG. 7, meshing between the third inner peripheral spline 34b and the fifth outer peripheral spline 31a is released.

A planetary gear mechanism 35 includes a sun gear 36 as a first element, a carrier 37 as a third element, a ring gear 38 as a second element, and a plurality of pinions 39 relatively rotatably supported on the carrier 37, the pinions 39 meshing with the sun gear 36 and the ring gear 38. The sun gear 36 is joined to the right-hand end of the third output shaft 32, and the ring gear 38 is connected to the right-hand end of the second output shaft 31.

A first inner peripheral spline 41a formed on a sleeve 41 of a second meshing switching mechanism 40, which is a dog clutch, meshes with an outer peripheral spline 37a formed on an outer peripheral part of the carrier 37 and an outer peripheral spline 42a formed on a casing 42. Therefore, when the sleeve 41 is moved leftward by a fork 41b to the position shown in FIG. 7, the carrier 37 is detached from the casing 42, and when the sleeve 41 is moved rightward by the fork 41b from the position shown in FIG. 8, the carrier 37 is joined to the casing 42.

The second power transmission switching mechanism S2 is provided between the transmission shaft 13 and the output shaft downstream portion 12B and includes a first outer peripheral spline 13a provided on the transmission shaft 13, a second outer peripheral spline 12b and a third outer peripheral spline 12c provided on the output shaft downstream portion 12B, a sleeve 43 equipped with an inner peripheral spline 43a, a fork 43b for driving the sleeve 43, and a second one-way clutch 45 disposed between the output shaft downstream portion 12B and the second outer peripheral spline 12b.

The sleeve 43 can take a leftward position in which the first outer peripheral spline 13a and the second outer peripheral spline 12b are joined, a middle position in which the first outer peripheral spline 13a, the second outer peripheral spline 12b, and the third outer peripheral spline 12c are joined, and a rightward position in which the second outer peripheral spline 12b and the third outer peripheral spline 12c are joined. Furthermore, the second one-way clutch 45 disposed between the output shaft downstream portion 12B and the second outer peripheral spline 12b is engaged when the rotational speed of the output shaft downstream portion 12B exceeds the rotational speed of the transmission shaft 13.

A differential case 47 forming an outer shell of the differential gear D is joined to the right-hand end of the second output shaft 31. The differential gear D includes a pair of pinions 49 and 49 rotatably supported on a pinion shaft 48 fixed to the differential case 47, and side gears 50 and 50 fixedly provided on end parts of the axles 10 and 10 and meshing with the pinions 49 and 49.

The operation of the embodiment of the present invention having the above arrangement is now explained.

First, the operation of one transmission unit U of the continuously variable transmission T is explained. When the rotating shaft 14a of the shift actuator 14 is rotated relative to the input shaft 11, the carrier 16 rotates around an axis L1 of the input shaft 11. In this process, a center O of the carrier 16, that is, the center of the equilateral triangle formed by the first pinion 15 and the two second pinions 17 and 17, rotates around the axis L1 of the input shaft 11.

Figure 4:
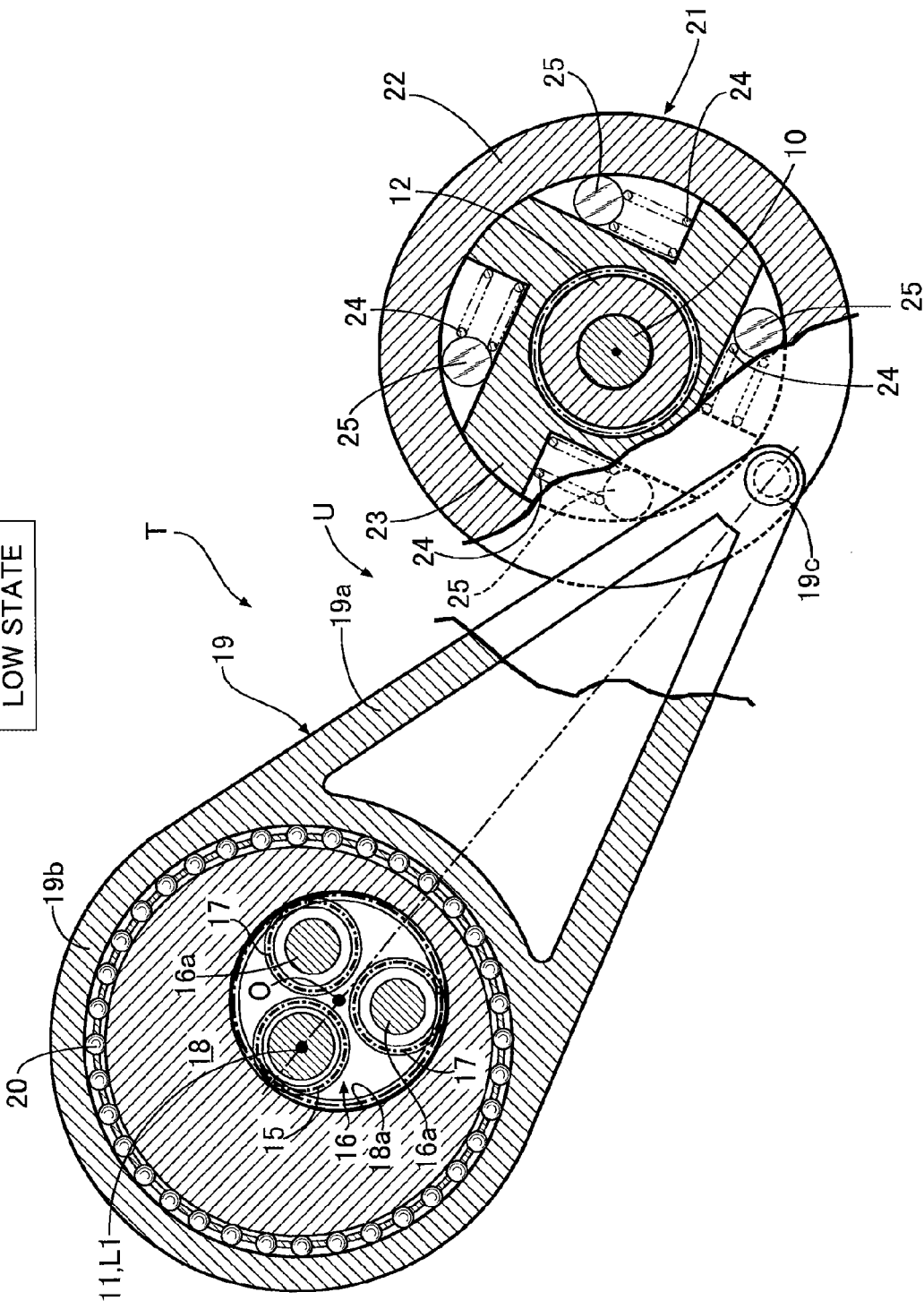
FIG. 4 is a sectional view (LOW state) along line 3-3 in FIG. 2. (first embodiment)
Figure 5:
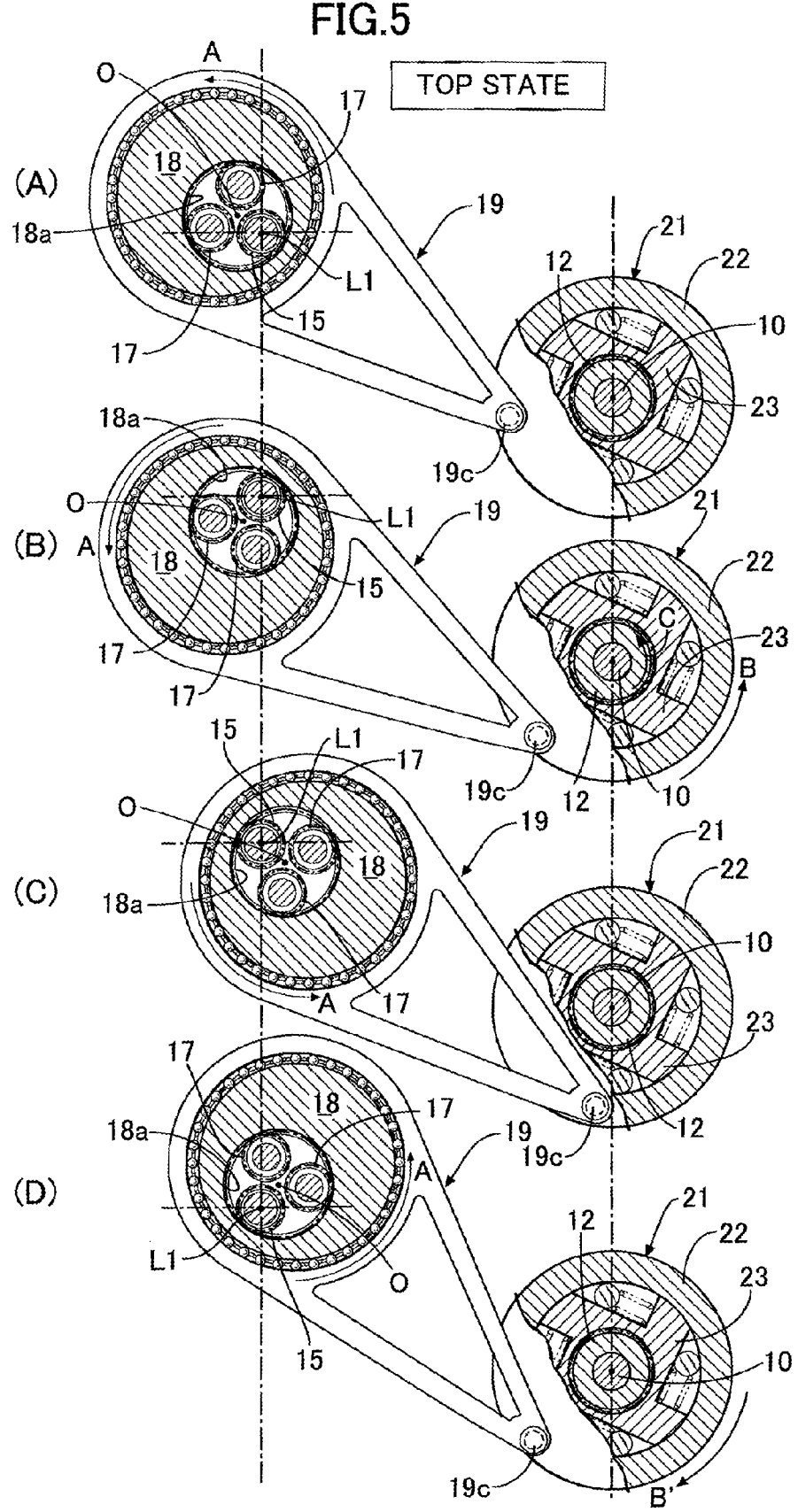
FIG. 5 is a diagram for explaining the operation in the TOP state. (first embodiment)
Figure 6:
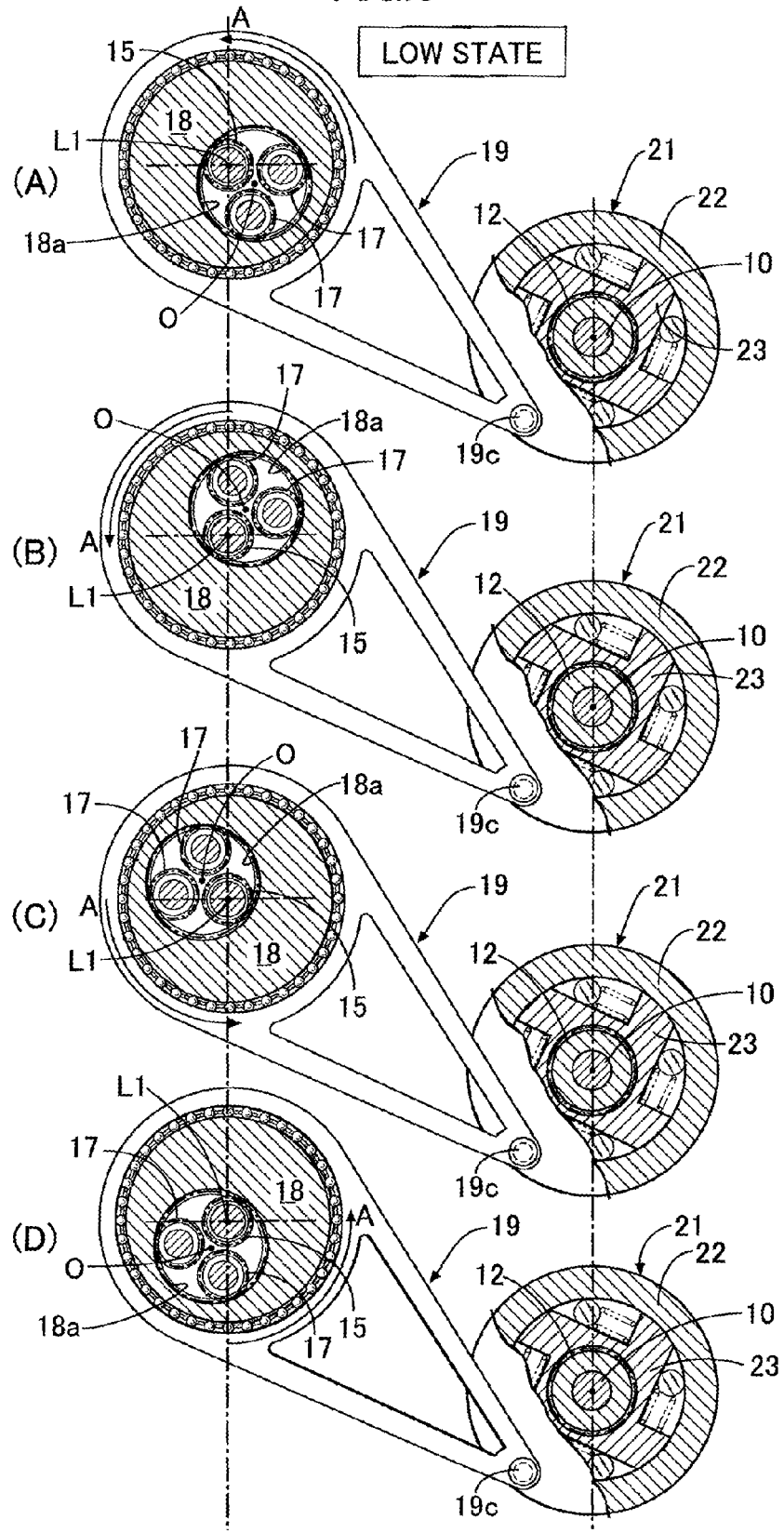
FIG. 6 is a diagram for explaining the operation in the LOW state. (first embodiment)

FIG. 3 and FIG. 5 show a state in which the center O of the carrier 16 is present on the side opposite to the first output shaft 12 with respect to the first pinion 15 (that is, the input shaft 11); here, the amount of eccentricity of the eccentric disk 18 relative to the input shaft 11 becomes a maximum, and the ratio of the continuously variable transmission T attains a TOP state. FIG. 4 and FIG. 6 show a state in which the center O of the carrier 16 is present on the same side as the first output shaft 12 with respect to the first pinion 15 (that is, the input shaft 11); here, the amount of eccentricity of the eccentric disk 18 relative to the input shaft 11 becomes a minimum, and the ratio of the continuously variable transmission T attains a LOW state.

When in the TOP state shown in FIG. 5 the input shaft 11 is rotated by the engine E and the rotating shaft 14a of the shift actuator 14 is rotated at the same speed as that of the input shaft 11; in a state in which the input shaft 11, the rotating shaft 14a, the carrier 16, the first pinion 15, the two second pinions 17 and 17, and the eccentric disk 18 are integrated, they rotate eccentrically in the counterclockwise direction (see arrow A) with the input shaft 11 as the center. While rotating from FIG. 5 (A) to FIG. 5 (B) and then to the state of FIG. 5 (C), the connecting rod 19, which has the ring portion 19b relatively rotatably supported on the outer periphery of the eccentric disk 18 via the ball bearing 20, rotates the outer member 22, which is pivotably supported at the extremity of the rod portion 19a by means of the pin 19c, in the counterclockwise direction (see arrow B). FIG. 5 (A) and FIG. 5 (C) denote opposite ends of rotation in the arrow B direction of the outer member 22.

When the outer member 22 rotates in the arrow B direction in this way, the rollers 25 bite into the wedge-shaped space between the outer member 22 and the inner member 23 of the first one-way clutch 21, rotation of the outer member 22 is transmitted to the first output shaft 12 via the inner member 23, and the first output shaft 12 therefore rotates in the counterclockwise direction (see arrow C).

When the input shaft 11 and the first pinion 15 rotate further, the eccentric disk 18 having the ring gear 18a meshing with the first pinion 15 and the second pinions 17 and 17 rotates eccentrically in the counterclockwise direction (see arrow A). While rotating from FIG. 5 (C) to FIG. 5 (D) and then to the state of FIG. 5 (A), the connecting rod 19 having the ring portion 19b relatively rotatably supported on the outer periphery of the eccentric disk 18 via the ball bearing 20 rotates the outer member 22, which is pivotably supported at the extremity of the rod portion 19a by means of the pin 19c, in the clockwise direction (see arrow B'). FIG. 5 (C) and FIG. 5 (A) denote opposite ends of rotation in the arrow B' direction of the outer member 22.

When the outer member 22 rotates in the arrow B' direction in this way, the rollers 25 are pushed out from the wedge-shaped space between the outer member 22 and the inner member 23 while compressing the springs 24, the outer member 22 slips against the inner member 23, and the first output shaft 12 does not rotate.

As hereinbefore described, when the outer member 22 rotates back and forth, since the first output shaft 12 rotates in the counterclockwise direction (see arrow C) only when the direction of rotation of the outer member 22 is counterclockwise (see arrow B), the first output shaft 12 rotates intermittently.

FIG. 6 shows the operation when the continuously variable transmission T is run in the LOW state. In this process, since the position of the input shaft 11 coincides with the center of the eccentric disk 18, the amount of eccentricity of the eccentric disk 18 relative to the input shaft 11 becomes zero. When in this state the input shaft 11 is rotated by the engine E and the rotating shaft 14a of the shift actuator 14 is rotated at the same speed as that of the input shaft 11; in a state in which the input shaft 11, the rotating shaft 14a, the carrier 16, the first pinion 15, the two second pinions 17 and 17, and the eccentric disk 18 are integrated, they rotate eccentrically in the counterclockwise direction (see arrow A) with the input shaft 11 as the center. However, since the amount of eccentricity of the eccentric disk 18 is zero, the stroke of back and forth movement of the connecting rod 19 also becomes zero, and the first output shaft 12 does not rotate.

Therefore, setting the position of the carrier 16 between the TOP state of FIG. 3 and the LOW state of FIG. 4 by driving the shift actuator 14 enables running to be carried out at any ratio between a ratio of zero and a predetermined ratio.

Since, with regard to the continuously variable transmission T, the phases of the eccentric disks 18 of the four transmission units U disposed side by side are displaced from each other by 90°, transmitting the driving force in turn from the four transmission units U, that is, putting at least one of the four first one-way clutches 21 in an engaged state at any one time, enables the first output shaft 12 to be rotated continuously.

The operation of the first power transmission switching mechanism S1, which switches between the parking range, the reverse range, the neutral range, and the drive range, is now explained.

Figure 9:
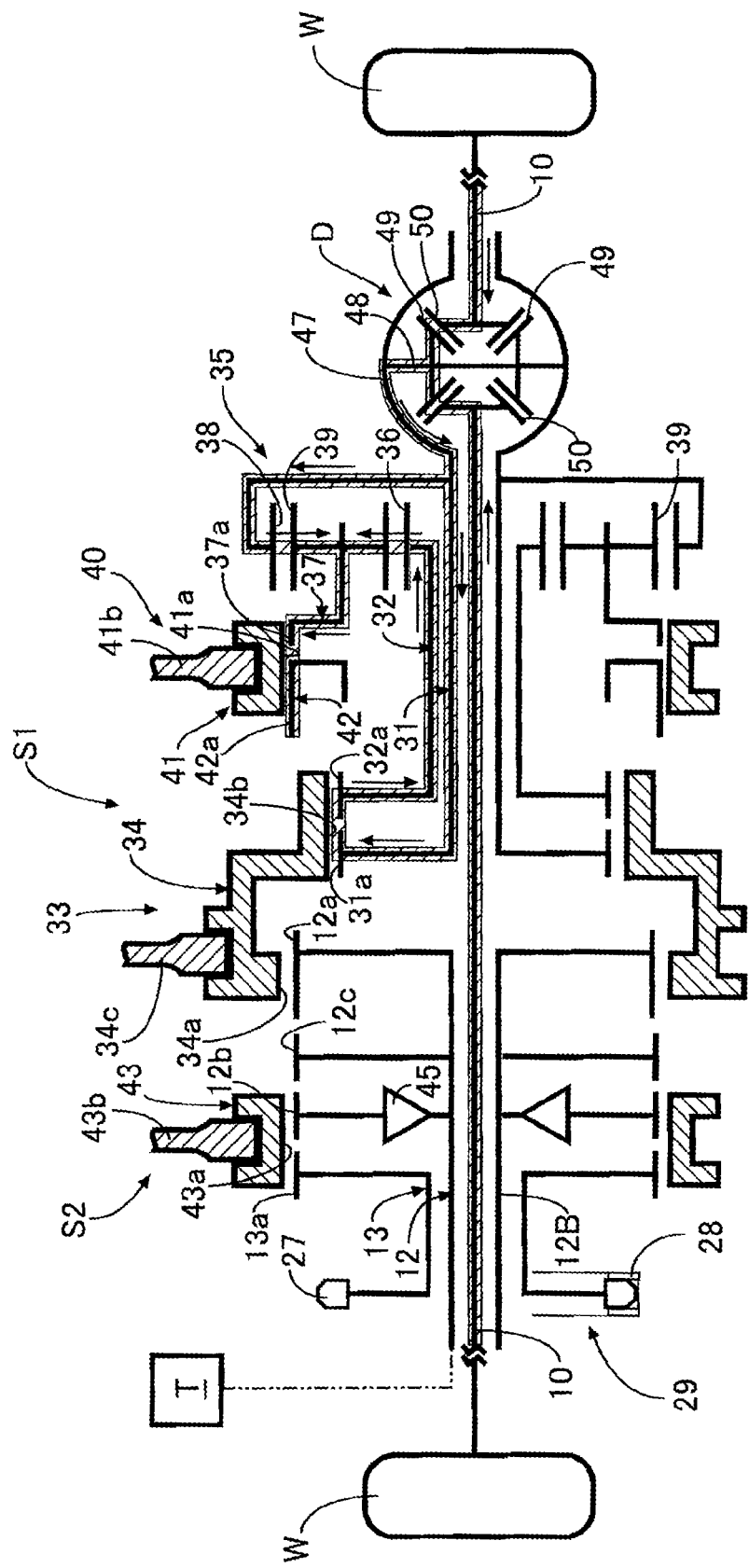
FIG. 9 is a torque flow diagram in a parking range. (first embodiment)

As shown in FIG. 8 and FIG. 9, when the sleeve 34 of the first meshing switching mechanism 33 is moved to the left to thus join the output shaft downstream portion 12B of the first output shaft 12, the second output shaft 31, and the third output shaft 32 as a unit, and the sleeve 41 of the second meshing switching mechanism 40 is moved to the right to thus join the carrier 37 of the planetary gear mechanism 35 to the casing 42, the parking range is established.

In the parking range, the second output shaft 31, which is integral with the differential case 47, is joined to the ring gear 38 of the planetary gear mechanism 35, the second output shaft 31 is connected to the sun gear 36 of the planetary gear mechanism 35 via the first meshing switching mechanism 33 and the third output shaft 32 and, furthermore, the carrier 37 of the planetary gear mechanism 35 is joined to the casing 42 via the second meshing switching mechanism 40. As a result, the planetary gear mechanism 35 attains a locked state, and the driven wheels W and W connected thereto via the differential gear D are non-rotatably restrained.

Figure 10:
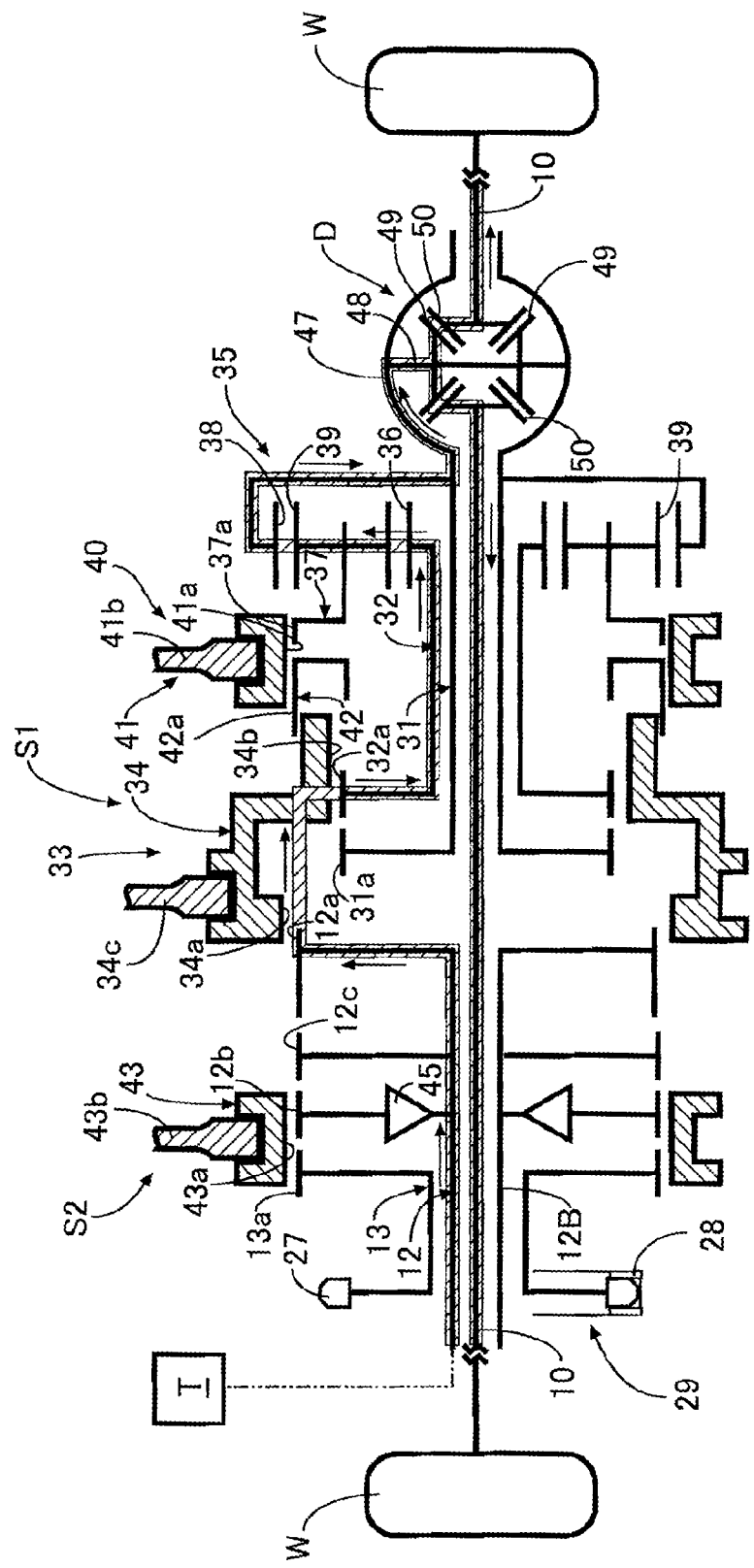
FIG. 10 is a torque flow diagram in a reverse range. (first embodiment)

As shown in FIG. 8 and FIG. 10, when the sleeve 34 of the first meshing switching mechanism 33 is moved to the right to thus join the output shaft downstream portion 12B and the third output shaft 32 and detach the second output shaft 31, and the sleeve 41 of the second meshing switching mechanism 40 is moved to the right to thus join the carrier 37 of the planetary gear mechanism 35 to the casing 42, the reverse range is established.

In the reverse range, the driving force outputted from the continuously variable transmission T to the output shaft downstream portion 12B of the first output shaft 12 is transmitted to the differential case 47 via the path: first meshing switching mechanism 33→third output shaft 32→sun gear 36→carrier 37→ring gear 38, and at the same time it is reduced in speed and reversed in rotation in the planetary gear mechanism 35, thus enabling the vehicle to be made to travel in reverse.

Figure 11:
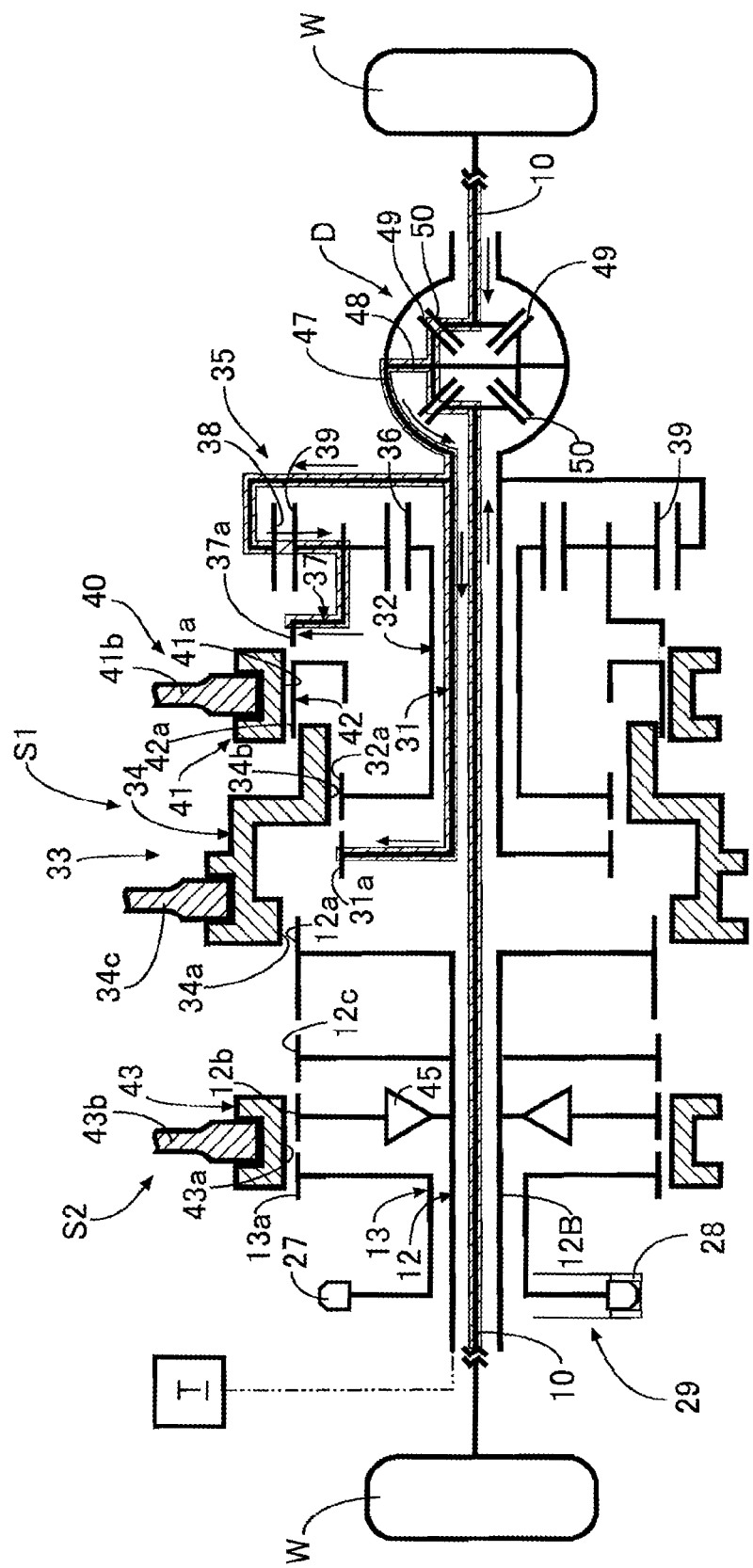
FIG. 11 is a torque flow diagram in a neutral range. (first embodiment)

As shown in FIG. 8 and FIG. 11, when the sleeve 34 of the first meshing switching mechanism 33 is moved to the right to thus join the the output shaft downstream portion 12B and the third output shaft 32 and detach the second output shaft 31, and the sleeve 41 of the second meshing switching mechanism 40 is moved to the left to thus detach the carrier 37 of the planetary gear mechanism 35 from the casing 42, the neutral range is established.

In the neutral range, since the carrier 37 of the planetary gear mechanism 35 is detached from the casing 42, the ring gear 38 can rotate freely, and since the second output shaft 31 can rotate freely, the differential case 47 can rotate freely, the driven wheels W and W thereby attaining a non-restrained state. In this state, the driving force of the engine E is transmitted from the continuously variable transmission T to the sun gear 36 via the path: output shaft downstream portion 12B→first meshing switching mechanism 33→third output shaft 32, but since the carrier 37 is not restrained, the planetary gear mechanism 35 idles, and the driving force is not transmitted to the differential gear D.

Figure 12:
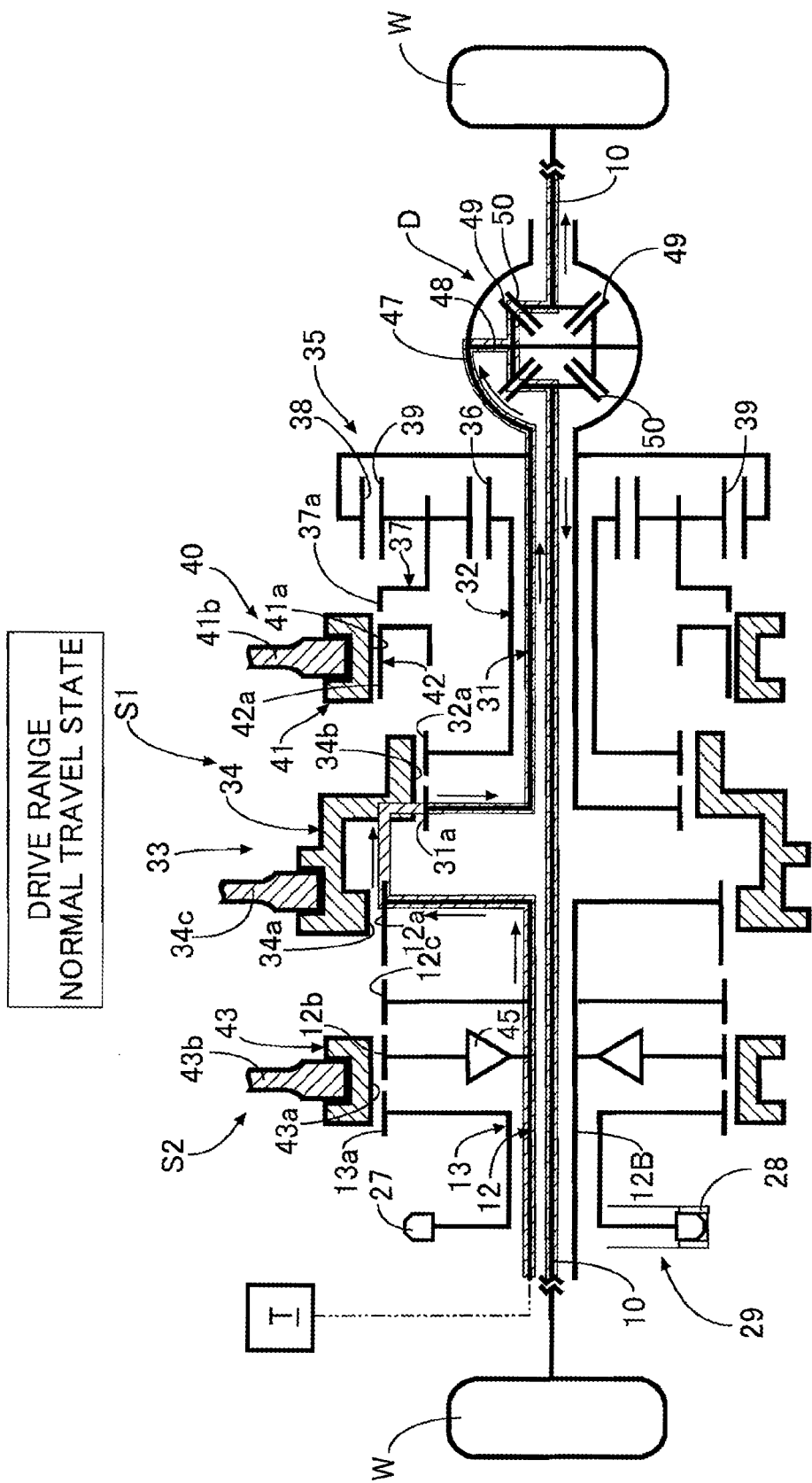
FIG. 12 is a torque flow diagram in a drive range (normal travel state). (first embodiment)

As shown in FIG. 9 and FIG. 12, when the sleeve 34 of the first meshing switching mechanism 33 is moved to the left to thus integrally join the output shaft downstream portion 12B, the second output shaft 31, and the third output shaft 32, and the sleeve 41 of the second meshing switching mechanism 40 is moved to the left to thus detach the carrier 37 of the planetary gear mechanism 35 from the casing 42, the drive range is established.

In the drive range, since the ring gear 38 and the sun gear 36 of the planetary gear mechanism 35 are joined to each other by means of the first meshing switching mechanism 33, the planetary gear mechanism 35 attains a state in which it can rotate as a unit. As a result, the driving force outputted from the continuously variable transmission T to the output shaft downstream portion 12B is transmitted to the differential case 47 via the path: first meshing switching mechanism 33→second output shaft 31 or via the path: first meshing switching mechanism 33→third output shaft 32→sun gear 36→carrier 37→ring gear 38, thus enabling the vehicle to be made to travel forward.

As hereinbefore described, since the driving force is transmitted via the first one-way clutches 21, the first output shaft 12 of the continuously variable transmission T of the present embodiment can rotate only in the direction of forward travel, but disposing the first power transmission switching mechanism S1 having a forward-reverse switching function on the downstream side of the first output shaft 12 enables the vehicle to be made to travel in reverse without hybridization, in which an electric motor is provided for reverse travel.

Moreover, since the first power transmission switching mechanism S1 can establish the parking range and the neutral range in addition to the drive range and the reverse range, it is possible to further reduce the size and lighten the weight of the power transmission device itself.

The operation of the second power transmission switching mechanism S2 for switching between a normal travel/engine braking state, an idling stop state, and a fail state is now explained.

As shown in FIG. 10 and FIG. 12, in a normal state in which the first power transmission switching mechanism S1 is in any of the parking range, the reverse range, the neutral range, and the drive range, which are described above, the sleeve 41 of the second power transmission switching mechanism S2 moves leftward thus providing a connection between the first outer peripheral spline 13a of the transmission shaft 13 and the second outer peripheral spline 12b of the output shaft downstream portion 12B. Therefore, when the vehicle is traveling in the drive range or the reverse range, the driving force of the engine E is not only transmitted from the input shaft 11 to the output shaft downstream portion 12B via the transmission units U, but also transmitted from the input shaft 11 to the transmission shaft 13 via the auxiliary power transmission means 29 formed from the first sprocket 26, the endless chain 28, and the second sprocket 27, and transmitted from the first outer peripheral spline 13a of the transmission shaft 13 to the second outer peripheral spline 12b of the output shaft downstream portion 12B.

However, since the gear ratio of the transmission units U is set so as to be larger than the gear ratio of the auxiliary power transmission means 29, the rotational speed of the transmission shaft 13 (that is, the rotational speed of the second outer peripheral spline 12b) becomes larger than the rotational speed of the output shaft downstream portion 12B, the second one-way clutch 45 is disengaged, power transmission via the auxiliary power transmission means 29 is not carried out, and the vehicle is made to travel forward or in reverse by means of power transmission via the transmission units U.

Figure 13:
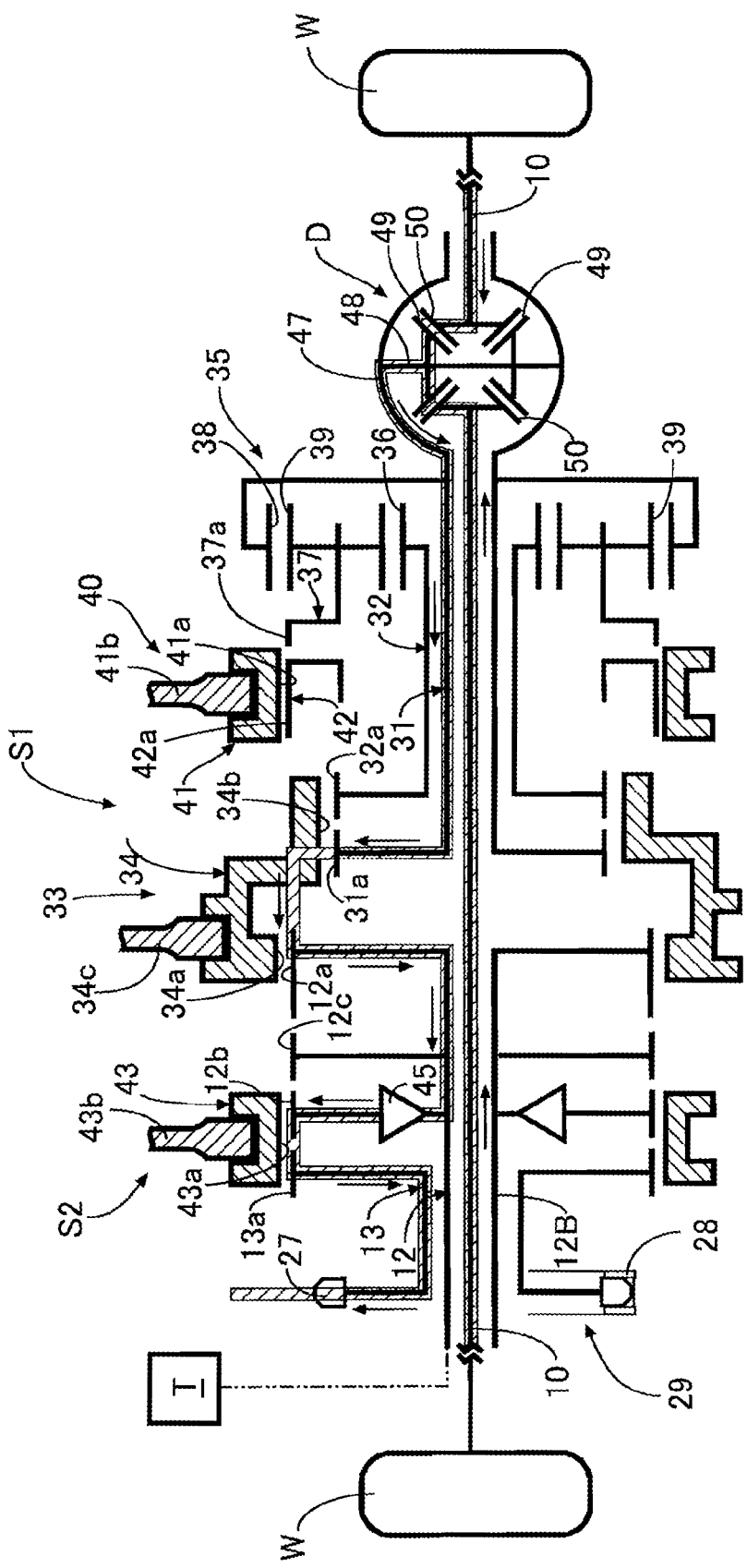
FIG. 13 is a torque flow diagram in a drive range (engine braking state). (first embodiment)

When the vehicle is shifted to a deceleration state while it is traveling forward in the drive range, as shown in FIG. 13, the engine rotational speed decreases and the first one-way clutches 21 of the transmission units U are disengaged, and the driving force from the driven wheels W and W is transmitted to the output shaft downstream portion 12B via the differential gear D and the first power transmission switching mechanism S1. In this process, the rotational speed of the output shaft downstream portion 12B becomes larger than the rotational speed of the transmission shaft 13 connected to the input shaft 11 via the auxiliary power transmission mechanism 29 (that is, the rotational speed of second outer peripheral spline 12b), the second one-way clutch 45 is engaged, and the driving force of the output shaft downstream portion 12B is thereby transmitted back to the engine E via the auxiliary power transmission means 29 and the input shaft 11, thus effecting engine braking.

Even when the vehicle decelerates while it is traveling in reverse in the reverse range, since the output shaft downstream portion 12B rotates in the same direction as with forward travel in the drive range, engine braking can be effected in the same manner.

Figure 14:
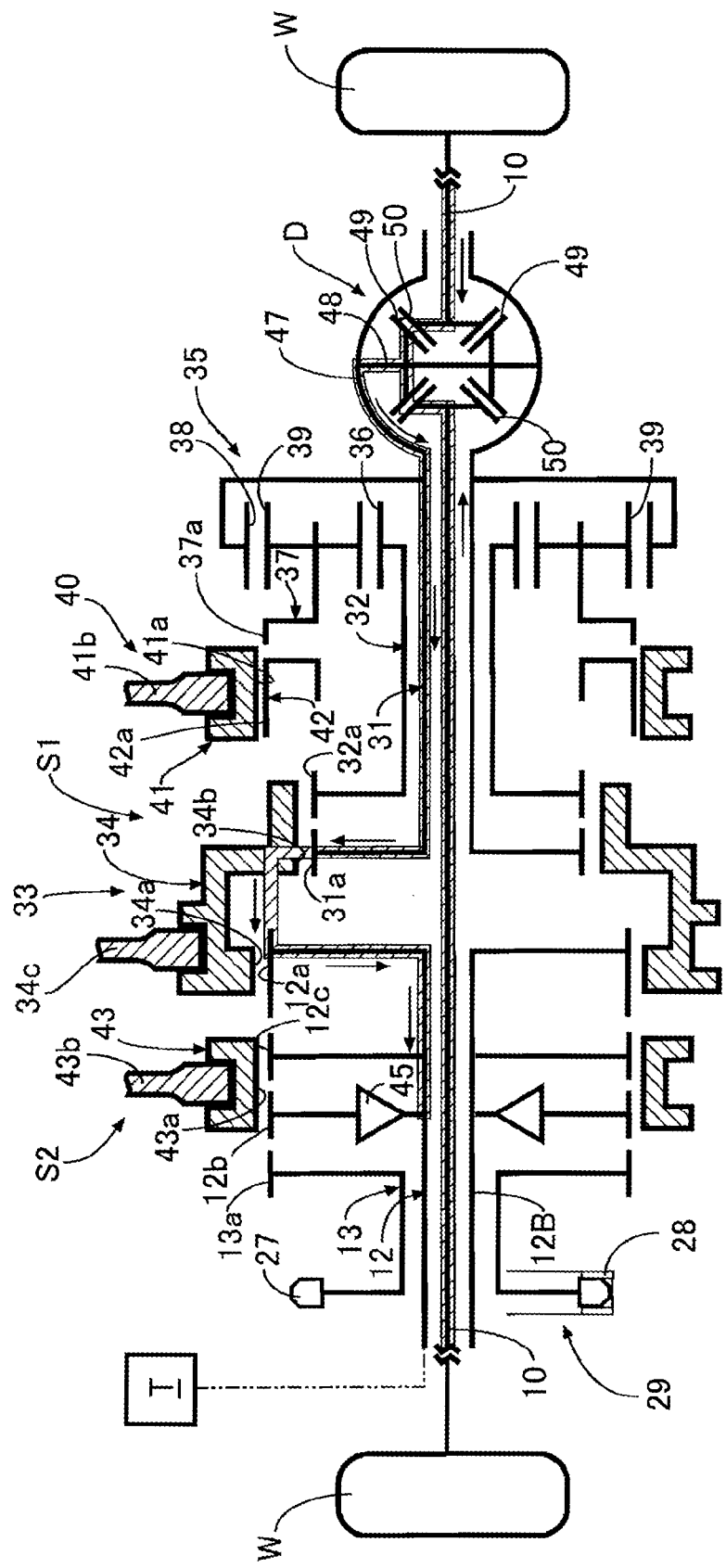
FIG. 14 is a torque flow diagram in a drive range (idling stop state). (first embodiment)

When the vehicle decelerates further while it is traveling in the drive range, as shown in FIG. 14, the second outer peripheral spline 12b and the third outer peripheral spline 12c of the output shaft downstream portion 12B are joined by moving the sleeve 41 of the second power transmission switching mechanism S2 rightward. As a result, the first output shaft 12, which is rotated by means of the driving force transmitted back from the driven wheels W and W, is detached from the transmission shaft 13 (that is, from the engine E), idling stop while decelerating is therefore enabled, and the fuel consumption can be reduced.

Figure 15:
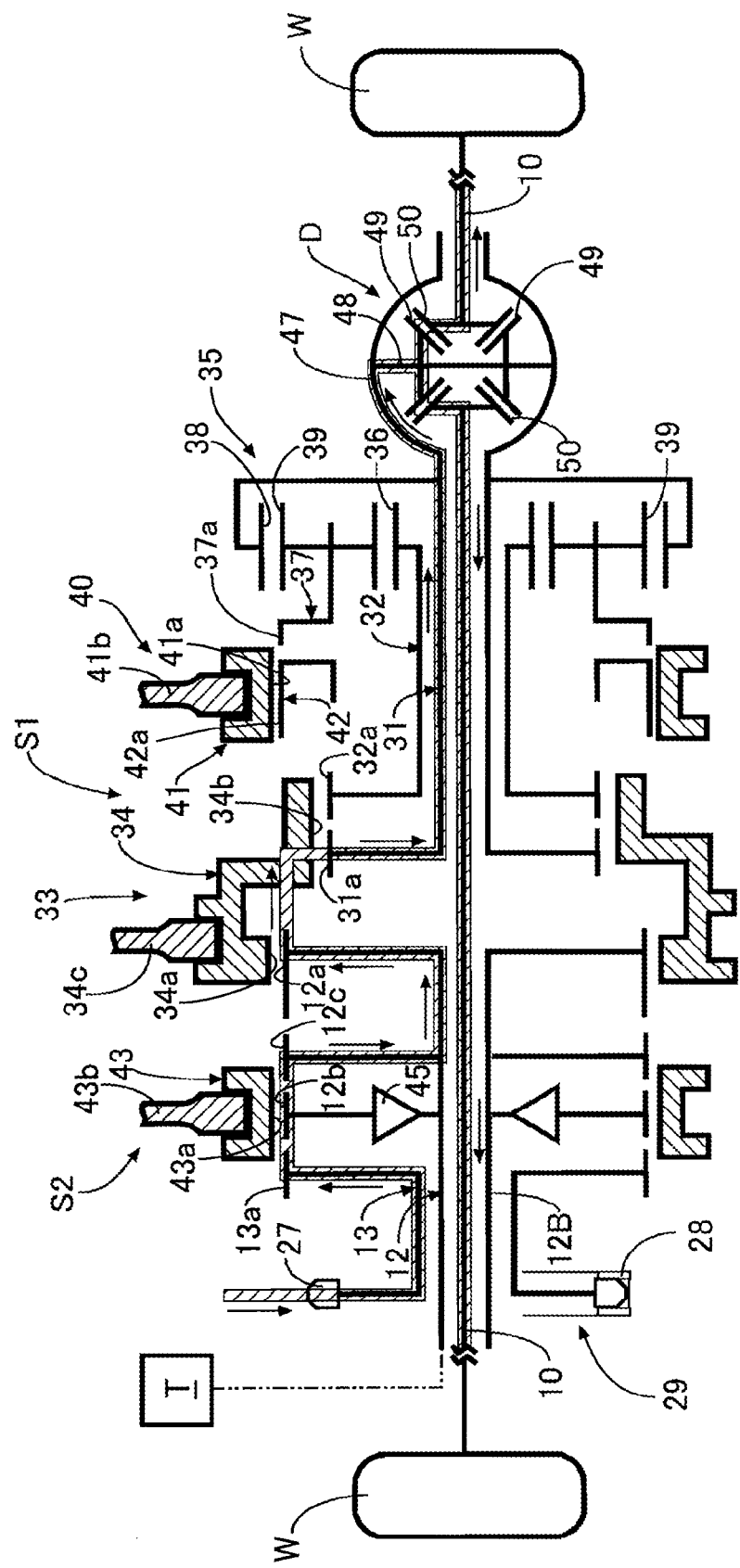
FIG. 15 is a torque flow diagram in a drive range (fail state). (first embodiment)

When there is a failure of the transmission units U and the vehicle is unable to travel, as shown in FIG. 15, the sleeve 41 of the second power transmission switching mechanism S2 is put into the middle position, and the first outer peripheral spline 13a of the transmission shaft 13 and the second outer peripheral spline 12b and the third outer peripheral spline 12c of the output shaft downstream portion 12B are joined. As a result, the transmission shaft 13 and the output shaft downstream portion 12B are directly joined without going through the second one-way clutch 45, the driving force of the engine E is therefore transmitted from the input shaft 11 to the driven wheels W and W via the auxiliary power transmission means 29, the transmission shaft 13, the output shaft downstream portion 12B, the first power transmission switching mechanism S1, and the differential gear D, and the vehicle can be made to travel forward or in reverse to a repair shop.

There is sometimes a malfunction in which the input shaft main body portion 11A is non-rotatably seized due to breakage of the ball bearing 53 (see FIG. 16) supporting the input shaft main body portion 11A or the ball bearing 20 (see FIG. 3) supporting the ring portion 19b of the connecting rod 19. When such a malfunction occurs, if the engine E and the input shaft main body portion 11A are inseparably connected to each other, the engine E will stall and be unable to run, and there is the problem that the vehicle is unable to travel.

However, in accordance with the present embodiment, since, when the input shaft main body portion 11A is seized, engagement of the dog clutch 52 is released to thus detach the input shaft main body portion 11A from the input shaft upstream portion 11B, due to switching to a fail state mode explained by reference to FIG. 15, the driving force of the engine E can be transmitted by means of the auxiliary power transmission means 29 from the input shaft upstream portion 11B to the output shaft downstream portion 12B without going through the continuously variable transmission T, thus enabling the vehicle to take refuge.

While taking refuge, the engine E and the driven wheels W and W are directly coupled, and it is therefore possible to actuate engine braking, but there is the problem that when the vehicle stops, the engine E, which is directly coupled to the driven wheels W and W, will stall. However, in accordance with the present embodiment, when the vehicle stops, if the sleeve 41 of the second power transmission switching mechanism S2 is moved leftward so as to connect the first outer peripheral spline 13a of the transmission shaft 13 and the second outer peripheral spline 12b of the output shaft downstream portion 12B, the driving force of the engine E inputted into the transmission shaft 13 is not transmitted to the output shaft downstream portion 12B due to the second one-way clutch 45 slipping, and even in a state in which the vehicle is stopped, idling is possible without the engine E stalling.

In a malfunction other than seizure of the input shaft main body portion 11A, since the input shaft main body portion 11A can rotate, it is not always necessary to disengage the dog clutch 52, but if the dog clutch 52 is disengaged so as to detach the input shaft main body portion 11A from the input shaft upstream portion 11B, it becomes possible to prevent drag on the continuously variable transmission T, thus saving fuel consumption.

As hereinbefore described, in accordance with the present embodiment, engine braking is enabled both when traveling forward and when traveling in reverse while enabling the vehicle to travel forward and in reverse without using an electric motor, which would increase the axial dimension of the vehicle power transmission device and, moreover, idling stop while the vehicle is decelerating and traveling when there is a failure of the transmission units U are enabled. Furthermore, the vehicle power transmission device tends to increase the axial dimension on the input shaft 11 side, to which the engine E is connected, but providing the transmission shaft 13 on the first output shaft 12 side enables any increase in the axial dimension on the input shaft 11 side to be suppressed, thus minimizing the overall axial dimension of the vehicle power transmission device.

Furthermore, due to the dog clutch 52 being disposed between the input shaft main body portion 11A and the input shaft upstream portion 11B, even if the input shaft main body portion 11A is seized and malfunctions, the vehicle can take refuge. Moreover, since the dog clutch 52, which is small in the axial direction, is employed, it is possible to avoid any increase in the dimension in the axial direction of the vehicle power transmission device. Furthermore, since the damper 51 is disposed between the engine E and the input shaft upstream portion 11B, the damping function of the damper 51 is exhibited even while taking refuge, thus ensuring good ride comfort.

An embodiment of the present invention is explained above, but the present invention may be modified in a variety of ways as long as the modifications do not depart from the spirit and scope thereof.

For example, the number of transmission units U is not limited to four as in the embodiment.

Furthermore, the clutch of the present invention is not limited to the dog clutch 52 of the embodiment, and any type of clutch may be employed.

The invention claimed is:

1. A vehicle power transmission device comprising:
a plurality of transmission units for transmitting rotation of an input shaft connected to a drive source to an output shaft, the transmission units arranged side by side between the input shaft and the output shaft,
the transmission units each comprising:
an input side fulcrum that has a variable amount of eccentricity from an axis of the input shaft and rotates together with the input shaft;
a first one-way clutch connected to the output shaft;
an output side fulcrum provided on an input member of the first one-way clutch;
a connecting rod that has opposite ends thereof connected to the input side fulcrum and the output side fulcrum and moves back and forth; and
a shift actuator that changes the amount of eccentricity of the input side fulcrum, wherein
the input shaft comprises an input shaft main body portion connected to the transmission unit, and an input shaft upstream portion further on an upstream side in a power transmission direction than the input shaft main body portion, the output shaft comprises an output shaft main body portion connected to the transmission unit, and an output shaft downstream portion further on a downstream side in the power transmission direction than the output shaft main body portion,
a clutch is disposed between the input shaft main body portion and the input shaft upstream portion, the clutch switching over a connecting state and disconnecting state therebetween, and
in order to enable the input shaft upstream portion and the output shaft downstream portion to be integrally rotated even in the disconnecting state of the clutch, the input shaft upstream portion and the output shaft downstream portion can be connected to each other for operative association via an input rotating member provided on the input shaft upstream portion, an output rotating member provided on the output shaft downstream portion, and a power transmission member connecting the input rotating member and the output rotating member to each other.

2. The vehicle power transmission device according to claim 1, wherein a second one-way clutch and selection switching means are disposed between the output rotating member and the output shaft downstream portion, the second one-way clutch being engaged when a rotational speed of the output shaft downstream portion exceeds a rotational speed of the output rotating member and being disengaged when the rotational speed of the output shaft downstream portion is less than the rotational speed of the output rotating member, and the selection switching means connecting the output rotating member to the output shaft downstream portion or disconnecting the output rotating member therefrom.

3. The vehicle power transmission device according to claim 1, wherein a damper is disposed between the drive source and the input shaft upstream portion.

4. The vehicle power transmission device according to claim 2, wherein a damper is disposed between the drive source and the input shaft upstream portion.

5. The vehicle power transmission device according to claim 1, wherein the clutch is a dog clutch.

6. The vehicle power transmission device according to claim 2, wherein the clutch is a dog clutch.

7. The vehicle power transmission device according to claim 3, wherein the clutch is a dog clutch.

* * * * *